April 19, 1960 J. MARLEY 2,933,642

SYSTEM FOR GENERATING A PERIODIC SCANNING CURRENT

Original Filed May 29, 1957 3 Sheets-Sheet 1

April 19, 1960 J. MARLEY 2,933,642

SYSTEM FOR GENERATING A PERIODIC SCANNING CURRENT

Original Filed May 29, 1957 3 Sheets-Sheet 2

April 19, 1960 J. MARLEY 2,933,642

SYSTEM FOR GENERATING A PERIODIC SCANNING CURRENT

Original Filed May 29, 1957 3 Sheets-Sheet 3

United States Patent Office 2,933,642

Patented Apr. 19, 1960

2,933,642

SYSTEM FOR GENERATING A PERIODIC SCANNING CURRENT

John Marley, Fort Wayne, Ind., assignor to Hazeltine Research, Inc., a corporation of Illinois Continuation of applications Serial Nos. 662,516 and 662,517, May 29, 1957. This application May 12, 1959, Serial No. 812,779

16 Claims. (Cl. 315—27)

*General*

The present invention is directed to systems for generating scanning currents and for supplying energy obtained by such generation. While the invention is of general application with respect to scanning systems, it has particular utility in television receivers which employ transistors wherever practical. Accordingly, the invention will be described in that environment.

Transistors offer a number of advantages over electron tubes and their use has become rather prevalent in radio apparatus such as portable radio receivers. Transistors are characterized by their very small size, lightness of weight, ruggedness, long operating life, extremely simple power requirements, and zero warm-up time. As a result, designers of television receiver equipment are giving transistors widespread attention for use wherever possible in television receivers.

To date it has not been feasible to build a tuner or radio-frequency amplifier system employing transistors which is not only inexpensive but also capable of operating satisfactorily in a television receiver. In the present state of the transistor art, it would, therefore, appear that such tuners would necessarily employ electron tubes. It is also contemplated that tubes may be employed to advantage in other receiver stages such as in the video-frequency amplifiers where they presently appear to afford performance superior to that of available transistors. Accordingly, it would seen that television receivers in the near future will be of a hybrid design such that some sections of a receiver will use electron tubes while others will employ transistors.

Efforts to build transistorized systems for generating periodic line-scanning currents for television receivers have not been entirely satisfactory primarily because the available transistors capable of handling the necessary power for a line-scanning system have poor transient responses. Power transistors in the environment of a line-scanning system must perform a rapid switching operation. Heretofore, such transistors could not be employed to perform this function because of their poor transient response.

The present application is a continuation of applicant's copending applications, Serial No. 662,516, now abandoned, entitled "System for Generating a Periodic Scanning Current" and Serial No. 662,517, entitled "Energy-Supply Apparatus," each filed May 29, 1957, which were also filed concurrently with applicant's copending application, Serial No. 662,518, entitled "Signal Modifier" and disclosing a circuit which includes a semi-conductor junction rectifier that is capable of generating a periodic scanning current. While the latter circuits are useful, the power losses in the inductor therein which is resonant at the line-scanning frequency are greater than is desired for many applications.

It is an object of the invention, therefore, to provide a new and improved system for generating a periodic scanning current.

It is another object of the invention to provide a new and improved system for generating a periodic scanning current which is capable of employing junction power transistors that are characterized by their relatively poor transient responses.

It is a further object of the invention to provide a new and improved switching system which is capable of employing for relatively high-frequency switching operations junction power transistors characterized by their relatively poor transient responses.

It is an additional object of the present invention to provide for use in a television receiver a new and improved transistorized line-scanning system employing a transistor capable of withstanding the relatively high voltage developed in portions of that system.

It is a still further object of the invention to provide a new and improved transistorized line-scanning system which is also capable of serving as energy-supply apparatus for developing operating potentials for the various portions of a television receiver.

It is yet another object of the invention to provide a new and improved transistorized line-scanning system which is capable of efficient operation.

In accordance with a particular form of the present invention, a system for generating a periodic scanning current comprises a junction power transistor which has a collector electrode, an asymmetrical signal-translating characteristic, a relatively poor transient response as a result of being able to withstand a relatively high collector voltage prior to breakdown, a carrier-storage characteristic at the frequency of the scanning current, input electrodes, and output electrodes including the collector electrode. The system also includes an essentially inductive load circuit coupled to the aforesaid output electrodes and including means for coupling a scanning winding thereto, and energizing means coupled to those output electrodes. The system further includes means coupled to the input electrodes for applying thereto a periodic potential at the frequency of the scanning current which alternately stores carriers in the transistor to cause it to conduct increasing collector current at a substantially constant collector voltage during a first interval of the scanning period and then sweeps the stored carriers therefrom to cause the transistor to conduct decreasing collector current at a decreasing collector voltage during a second subsequent interval thereof at the end of which the transistor becomes non-conductive at a rate influenced by its transient response. The collector current thereby produces a portion of the scannning current in the load circuit which tends to gradually terminate by the end of the second interval. The generating system additionally includes a semi-conductor junction rectifier coupled to the output electrodes of the foregoing transistor and having a carrier storage characteristic responsive to the collector voltage thereof to store carriers during the first scanning interval and to conduct the carriers so stored to the load circuit to provide another portion of the saw-tooth current therein during the second interval thereof, the transient response of the rectifier being such that the current it thereby supplies to the load circuit during the second interval supplements the decreasing collector current then being supplied thereto to produce a resultant scanning current of improved saw-tooth wave form which terminates in accordance with the transient response of the rectifier instead of that of the transistor.

The invention is further directed to provide an energy-supply apparatus for a television receiver, such apparatus comprising a transistor having input and output electrodes and means for applying a periodic wave to the input electrodes. The apparatus also comprises a load circuit, including a transformer having a plurality of winding portions and means for connecting a scanning coil to one of such winding portions. The load circuit also includes a direct-current circuit which itself includes unidirectional potential-supply means, one of the winding portions and a first unidirectionally conductive device, means being provided in such load circuit for conductively connecting one of the winding portions of the transformer to the output electrodes of the transistor. The foregoing load circuit is thus adapted to respond to the periodic input wave to develop a saw-tooth current in the scanning coil during periodic trace intervals respectively followed by periodic retrace intervals and to develop in the transformer a potential of periodic pulses during such retrace intervals and a more constant potential during the trace intervals. Finally, the energy-supply apparatus comprises a potential-supply system including a second unidirectionally conductive device inductively coupled to the load circuit and responsive to the potential developed in the transformer during trace intervals of the saw-tooth current to derive substantial power at a unidirectional potential level having a value different from that of the potential- supply means in the direct-current circuits.

For a better understanding of the present invention, together with other and further objects thereof, reference is had to the following description taken in connection with the accompanying drawings, and its scope will be pointed out in the appended claims.

Referring to the drawings.

Figure 1:
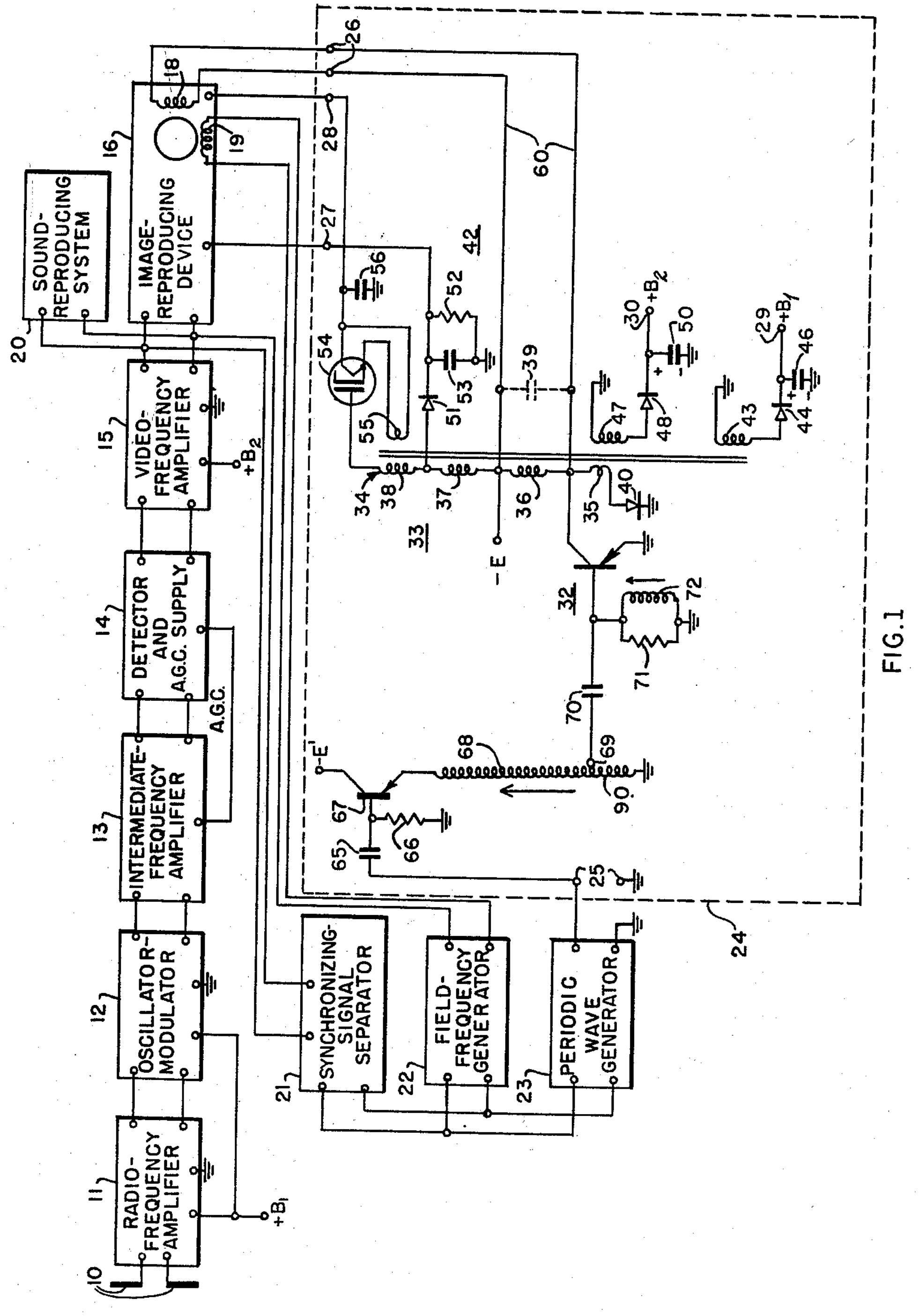
Fig. 1 is a circuit diagram, partly schematic, of a complete television receiver including a system for generating a periodic scanning current and for supplying energy obtained by such generation in accordance with a particular form of the present invention.

*General description of receiver of Fig. 1*

Referring now more particularly to Fig. 1 of the drawings, the television receiver there represented comprises a receiver of the superheterodyne type including an antenna system 10 coupled to a radio-frequency amplifier 11 of one or more stages. There are coupled to the latter unit in cascade, in the order mentioned, an oscillator-modulator 12, and intermediate-frequency amplifier 13 of one or more stages, a detector and automatic-gain-control or AGC supply unit 14, a video-frequency amplifier 15 of one or more stages, and a cathode-ray image-reproducing device 16 of conventional construction provided with the usual line-frequency and field-frequency scanning windings 18 and 19, respectively, for deflecting the cathode-ray beam in two directions normal to each other. The AGC supply of unit 14 is connected to the input circuit of at least the first stage of the intermediate-frequency amplifier 13 when the latter includes transistors as will be mentioned hereinafter. Connected to the output terminals of the video-frequency amplifier 15 is a conventional intercarrier sound-signal reproducing system 20 which includes the usual 4.5 megacycle signal selector, frequency detector, audio-frequency amplifier, and loudspeaker.

The output circuit of the video-frequency amplifier 15 is coupled to the input circuit of a field-frequency generator 22 and a line-frequency periodic wave generator 23 through a synchronizing-signal separator 21. Generator 23 may be capable of developing periodic pulses or a sine wave at the line-scanning frequency. For the purpose of the present consideration, it will be deemed to be one which develops a sine-wave output voltage. The output circuit of the field-frequency generator 22 is coupled to the field-scanning winding 19 while the output circuit of the periodic wave generator 23 is coupled to a pair of input terminals 25, 25 of the system 24 in accordance with the present invention for generating a periodic scanning current. The system 24 includes a pair of output terminals 26, 26 which are connected to the line-scanning winding 18 of the image-reproducing device 16 and further may include output terminals 27 and 28 for supplying, respectively, an intermediate voltage to the first anode of the image-reproducing device and a high voltage to the second anode thereof. The system 24 may still further include output terminals 29 and 30 for connection in the well-known manner (not shown) to the potential-supply terminals of units 11, 12, and 15 designated as $+B_1$ and $+B_2$ as represented.

The units 10–16, inclusive, and 20–24, inclusive, with the exception of the system 24, which is constructed in accordance with the present invention and will be described in detail hereinafter, may be of conventional construction and operation so that a detailed description and explanation of the operation thereof are unnecessary. However, it will be assumed that the various signal-translating stages of the intermediate-frequency amplifier 13, the sound-reproducing system 20, the synchronizing-signal separator 21, the field-frequency generator 22, and the periodic wave generator 23 employ transistors so that low operating potentials of about 12 volts are required for their energization. It will also be assumed that the radio-frequency amplifier 11 and the video-frequency amplifier 15 employ electron tubes necessitating considerably higher operating potentials for their anode circuits, which potentials are to be supplied by system 24 along with the line-scanning wave and the operating potentials for the first and second anodes of the image-reproducing device 16.

*General operation of Fig. 1 receiver*

Considering briefly the general operation of the above-described receiver as a whole, signals intercepted by the antenna system 10 are selected and amplified in the radio-frequency amplifier 11 and are supplied to the oscillator-modulator 12 wherein they are converted to intermediate-frequency signals. The latter, in turn, are selectively amplified by the intermediate-frequency amplifier 13 and are delivered to the detector and automatic-gain-control supply of unit 14. Modulation components of the signal are derived by the detector of unit 14 and are supplied to the video-frequency amplifier 15 wherein they are amplified and supplied to the brilliancy-control electrode of the image-reproducing device 16. A control voltage derived by the automatic-gain-control supply of unit 14 is applied as an automatic-amplification-control bias to the gain-control circuit of the first intermediate amplifier stage of unit 13 to maintain the signal input to the detector of unit 14 within a relatively narrow range for a wide range of received signal intensities.

Unit 21 selects the synchronizing signals from the other modulation components of the composite video-frequency signal applied thereto from the video-frequency amplifier 15. The line-synchronizing and the field-synchronizing signals derived by the separator 21 are then supplied to the respective ones of the generators 22 and 23 to synchronize the operation thereof. Unit 23 develops a periodic voltage for application to the system 24 to control the operation thereof. An electron beam is produced by the cathode-ray image-reproducing device 16 and the intensity of this beam is controlled in accordance with the video frequency and the control voltage impressed on the brilliancy-control electrode from the video-frequency amplifier 15. Saw-tooth current waves generated in the field-frequency generator 22 and in the system 24 are applied to the scanning windings 19 and 18 of unit 16 to produce scanning fields, thereby to deflect the cathode-ray beam of that unit in two directions normal to each other to trace a rectilinear scanning pattern on the screen of the tube and thereby reconstruct the translated picture.

The sound signal is applied by the video-frequency amplifier 15 to the sound-signal reproducing system 20 wherein the audio-frequency modulation components are derived in a conventional manner by the frequency detector of that unit and are then applied to the audio-frequency amplifier thereof for amplification and application to the loudspeaker for conversion to sound.

*Description of generating system 24 of Fig. 1*

Referring now more particularly to the portion of the Fig. 1 receiver embodying the present invention, the system 24 for generating a periodic scanning current comprises a junction power transistor 32 which has the usual emitter, base, and collector electrodes, an asymmetrical signal-translating characteristic, a relatively poor transient response as a result of being able to withstand a relatively high collector voltage prior to breakdown, and a carrier-storage characteristic at the frequency of the aforesaid scanning current. Typical of the junction power transistor of the type under consideration is the Columbia Broadcasting System type 2N158 and the Delco type 2N174.

It is meant by the use of the term "asymmetrical signal-translating characteristic" that the junction power transistor is one wherein, if a signal is applied between a pair of input electrodes for translation to the output electrodes, that signal is translated better than if it were applied to another pair of electrodes serving as input electrodes. Expressed somewhat differently, it is impractical to interchange the connections to the collector and emitter electrodes for signal-translating purposes. In order for a transistor to withstand higher voltages, it is well known that the thickness of the semiconductive material between electrodes must be greater than that for a transistor which is useful in low-voltage applications. As the thickness of this semiconductive material increases, the transient or high-frequency response decreases because of the greater time required for carriers to cease their movement through the material. It is for this reason that junction power transistors which are capable of withstanding a relatively high collector voltage prior to breakdown are employed to a considerable extent for low-frequency switching applications at switching rates of about 400 times per second. While the carrier-storage phenomenon in transistors is known, it is not clearly understood by workers in the art. Accordingly, it is believed that a brief explanation thereof will be helpful. If the base input current to a transistor is large so that the collector voltage is reduced to a low or minimum value by that flow of base current, many of the available carriers will travel into the base material. If, then, an attempt is made to cut off the transistor, the collector current will continue to flow at the low-saturation voltage at the collector until all the carriers stored in the base region flow out of that region. Because of the slow movement of these carriers, this action may take as long as 15 to 30 microseconds in a power transistor. This phenomenon has been termed carrier or hole storage.

Figure 2:
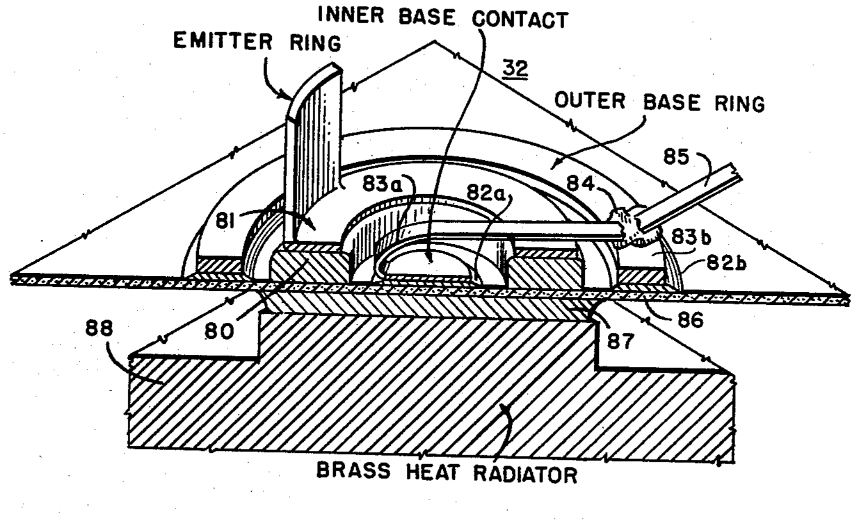
Fig. 2 is an enlarged sectional view of a junction power transistor.

Reference is now made to Fig. 2 wherein there is represented an enlarged sectional view of a somewhat simplified form of a junction power transistor. This device comprises an annular emitter electrode 80 of P-type semiconductive material having secured thereto a conforming annular conductive terminal 81 for connection to an external circuit. The transistor 32 also includes an inner base electrode 82*a* of N-type semiconductive material having a terminal 83*a* secured thereto and further includes an annular outer base electrode 82*b* of similar material having secured thereto an annular conductive terminal 83*b*. Terminals 83*a* and 83*b* are interconnected as by a drop of solder 84 and an external terminal 85 serves to connect the two base electrode portions to an external circuit. A layer of semiconductive material 86 separates the collector electrode 87 of P-type semiconductive material from the emitter and base electrodes described above. The thickness of this layer is selected so that the transistor 32 is capable of withstanding a relatively high collector voltage of about 100 volts or more prior to breakdown. A block 88 of conductive material such as brass is in contiguous relation with the collector electrode 87 and serves as a heat radiator for dissipating the heat developed at the collector electrode 87 when the transistor is in operation. Such a transistor has an asymmetrical signal-translating characteristic, a relatively poor transient response as a result of its geometry which permits it to withstand a relatively high collector voltage prior to breakdown, and a carrier-storage characteristic at the frequency of the scanning current to be developed in the line-scanning winding 18 represented in Fig. 1.

The system 24 for generating a periodic scanning current also comprises an essentially inductive load circuit 33 which includes an autotransformer 34, having a plurality of winding portions 35, 36, 37, and 38, coupled to the collector and emitter output electrodes of transistor 32 and including means for coupling a scanning winding to one of those winding portions. The line-scanning winding 18, which preferably is a multistrand member having a low impedance, is connected to the winding portion 36 through the pair of terminals 26, 26 and conductors 60, 60. A condenser 39, which is shown in broken line construction since it may comprise in whole or in part the inherent capacitance associated with the transformer windings, is connected in parallel with the winding portion 36 and is resonant with the winding 18 at a frequency at least several times that of the scanning current. A typical resonant frequency is approximately 5 times that of the scanning current.

The generating system 24 also includes energizing means which is coupled to the output electrodes of the transistor 32 through the winding portion 36. This energizing means comprises a unidirectional potential source having one of its terminals designated −E connected to the junction of the winding portions 36 and 37 and its other terminal connected to the grounded emitter of the transistor. The purpose of the various other winding portions of the transformer 34 will be made clear subsequently.

The generating system 24 additionally includes means coupled to the emitter and base input electrodes for applying thereto a periodic pulse potential which alternately renders the transistor conductive and nonconductive, alternately stores carriers in the transistor and removes at least some therefrom at a rate influenced by the transient response of the transistor, alternately stores energy in the load circuit 33 and develops therein the scanning current with an approximately saw-tooth wave form. This periodic pulse potential applying means includes a pair of terminals 25, 25 and a transistor 67 with an emitter load circuit in the form of a tunable inductor 68 for supplying a sine-wave potential which has the frequency of the scanning current that is developed in winding 18. The transistor 67 is connected as an emitter-follower amplifier and, to that end, the base electrode is coupled to the high-potential one of the terminals 25, 25 through a coupling condenser 65 and is also connected to ground through a bias resistor 66. The collector electrode is connected to a suitable energizing source indicated as −E′ while the emitter electrode is connected to ground through the inductor 68. In order to supply a periodic voltage at the proper impedance level to the base electrode, a tap 69 on the inductor is connected to the base electrode of the transistor through a coupling condenser 70. The condenser 70 and the portion 90 of the inductor 68 between the tap 69 and ground are series resonant with the emitter-base junction of transistor 32 at the frequency of the periodic scanning current developed in the line-scanning winding 18. The parallel combination of a choke 72 and a damping resistor 71 is connected between the base electrode of the transistor 32 and ground. The choke 72 has a low direct-current resistance and preferably has a ferrite core. This choke is resonant with the capacitance of the input circuit of transistor 32 at a very high frequency such as about one-half a megacycle.

The generating system 24 further includes a semiconductor junction rectifier 40 which is coupled between the collector and emitter electrodes through the winding portion 35. This rectifier has a transient response which may be different from that of the transistor 32 and ordinarily is considerably better than that of the transistor, and further has a carrier-storage characteristic that permits a substantial reverse-current conduction in the rectifier at a time such that this conduction effectively supplements the transient response of the transistor 32, alternately transfers the energy stored in the load circuit 33 to the energizing means indicated as −E, and improves the saw-tooth wave form of the scanning current developed in the line-scanning winding 18. As will be made clear hereinafter, it is the rectifier 40 which, in effect, improves the switching action of the junction power transistor 32 with reference to the current supplied to the scanning winding 18. Applicant has determined that a semiconductor junction rectifier, unlike a junction power transistor, is able to cut off substantially instantaneously when the carriers stored therein are swept out. The winding portion 35 ordinarily has a fewer number of turns than the winding portion 36 and these are chosen to provide by the action of the transformer a small added driving potential which facilitates the generation of a larger scanning current. The semiconductor junction rectifier 40 may comprise the output section of a 2N158 junction transistor or may be the two diodes found in a type IN158 rectifier assembly, the diodes being connected in parallel in order to reduce the voltage drop thereacross during its conductive intervals.

The periodic scanning-current generating system 24 preferably includes a potential-supply means 42 coupled through other winding portions and windings of the transformer 34 for developing a plurality of unidirectional potentials having different potential levels. This means includes a high-voltage rectifier system including a diode 54 having its anode connected to the high-voltage terminal of winding portion 38 and its cathode connected to ground through a storage condenser 56 and the output terminal 28. An auxiliary transformer winding 55 supplies heater current to the filament for the cathode of the diode 54. An operating potential for the accelerating electrode of the image-reproducing device 16 is developed by a peak rectifier system which includes a crystal diode 51 having one terminal connected to the junction of the winding portions 37 and 38 and its other terminal connected to output terminal 27 and to ground through a filter network 52, 53. The rectifier 51 is poled to conduct the positive-going pulses developed during the retrace intervals of the scanning wave supplied to the line-scanning winding 18 of device 16. The potential-supply means 42 further includes a winding 43 inductively coupled to the previously identified portions of transformer 34. One terminal of the winding 43 is grounded while its other terminal is connected through a diode 44 to an output terminal 29 and to ground through a filter condenser 46. Diode 44 is poled to rectify the trace portion of the applied wave. It will be understood that the turns ratio of the winding 43 and the winding portion 36 is such that there is developed at terminal 29 a unidirectional voltage $+B_1$ of a magnitude different from that of voltage-supply means −E suitable for application to the terminal $+B_1$ of the radio-frequency amplifier 11 and the oscillator-modulator 12. The potential-supply means 42 may also include another rectifier arrangement similar to the one just described for developing a voltage $+B_2$ for application by the terminal 30 to the terminal $+B_2$ of the video-frequency amplifier 15. To this end, the rectifier arrangement includes a winding 47, a diode 48 similar to the diode 44, and a filter condenser 50 as represented.

*Explanation of operation of generating system 24*

Figure 3:
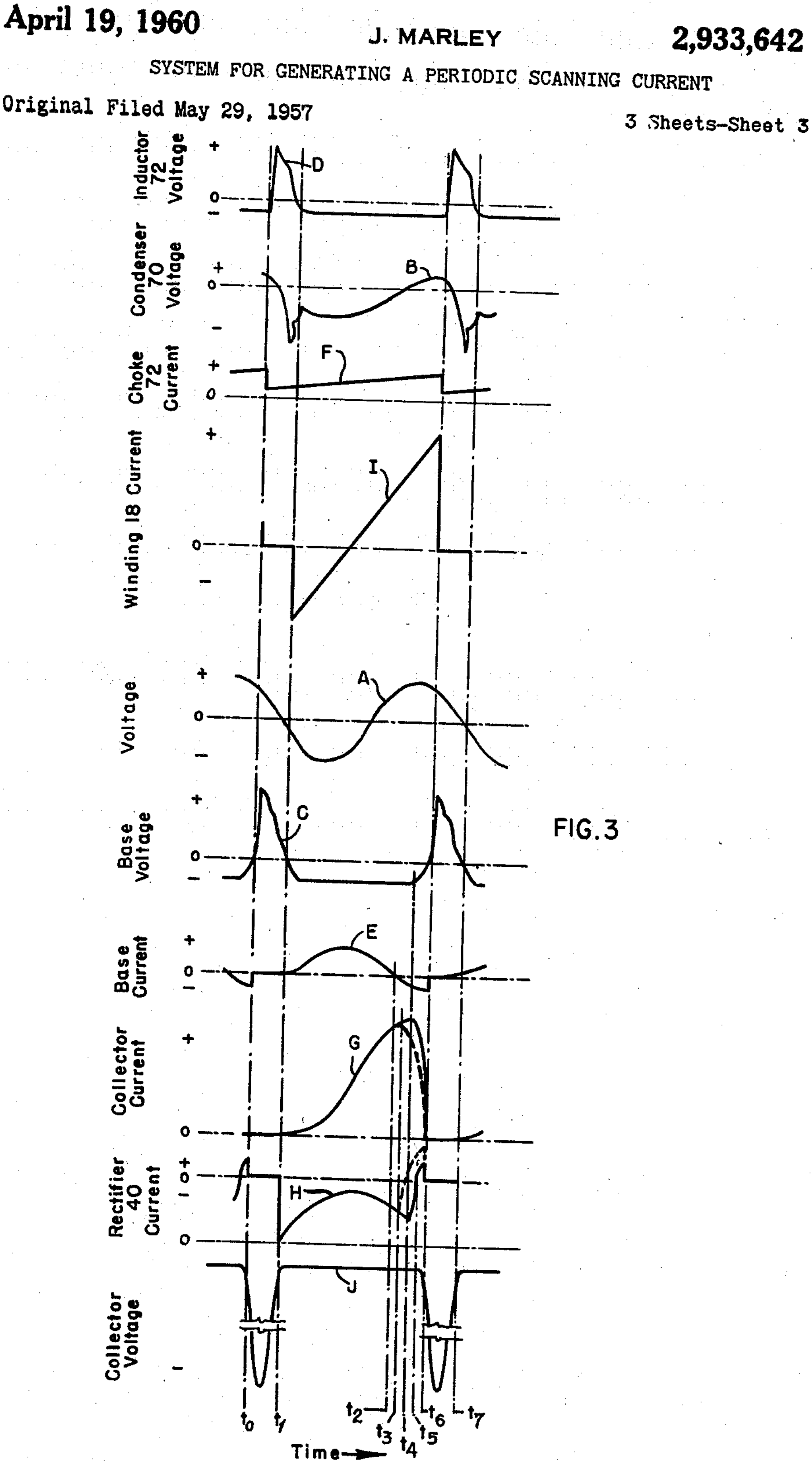
Fig. 3 is a graph utilized in explaining the operation of the Fig. 1 system.

In considering the operation of the generating system 24 of Fig. 1, reference is made to the curves of Fig. 3. Curve A represents a portion of a 15.75 kilocycle sine-wave voltage developed by the periodic wave generator 23 for application to the input terminals 25, 25 and translation to the inductor 68 in the emitter circuit of the emitter-follower transistor amplifier 67. Curve B represents the voltage derived therefrom across the condenser 70 of the series-resonant circuit 70, 90. A voltage having the wave form represented by curve C appears at the base electrode of the transistor 32. It will be seen that the potential of curve C is a periodic pulse potential which, during the retrace intervals $t_0$–$t_1$ and $t_6$–$t_7$, swings in a positive direction and renders the transistor 32 non-conductive. During the trace interval $t_1$–$t_6$ the base electrode swings negatively in the manner represented and proceeds to render the transistor conductive. The choke 72 contributes to formation of the steep periodic pulse voltage applied to the base electrode of transistor 32 during the retrace intervals. When the transistor begins to cut off during the start of the retrace intervals, the choke 72, which resonates with the input circuit capacitance of the transistor 32 at a frequency of about one-half megacycle, is shock-excited and develops the sharp positive-going pulses represented by curve D. The resistor 71 damps this shock-excited circuit so that the trailing edges of the pulse of curve D diminish somewhat gradually in the manner represented and ringing in this tuned circuit is prevented so that the transistor cannot be turned on momentarily during the latter portions of the retrace intervals. By the time the induced voltage in choke 72 has dropped substantially to zero the input sine wave has entered its negative half cycle rendering the base of transistor 32 negative and causing it to again conduct and to store carriers. Some energy is stored in the resonant circuit including the choke 72 during the retrace intervals and this may be utilized during subsequent trace intervals when the transistor 32 is conductive to enhance the carrier-storage properties of the transistor.

The drive voltage for the transistor 32 and the resultant storage of carrier current in the base is such that the transistor is conducting in a saturated condition for most of the trace interval $t_1$–$t_6$. The base current varies as represented by curve E, and the carrier-storage action within the junction power transistor for most of the trace interval $t_1$–$t_6$ is such that a very large reverse base current flows toward the end portion $t_2$–$t_6$ of that trace interval. The inductance of the choke 72 functions similar to a video-peaking coil and tends to increase the sinusoidal current, represented by curve E, as flowing in the base circuit during the interval $t_1$–$t_2$. Carriers are being stored in the base zone of the transistor 32 during this interval. The base impedance of the junction power transistor is very nonlinear and any current irregularities are absorbed by the choke coil 72. The wave form of the current flowing in the choke 72 is represented by curve F. It will be seen that when the base current of curve E sharply drops to zero, at time $t_6$, the choke current of curve F sharply rises in the opposite direction. The net current drawn at terminal 69 thus remains substantially sinusoidal.

The collector current of the transistor 32 initially increases rather slowly during the first portion of the trace interval $t_1$–$t_6$ as represented by curve G. Since energy was stored during the preceding retrace interval $t_0$–$t_1$ in the line-scanning winding 18 connected to the winding portion 36 of the transformer 34, this stored energy and also that appearing in the transformer will result in a voltage across those windings which endeavors to send a reverse current into the collector circuit of the switching transistor 32 during the initial portion of the trace interval $t_1$–$t_6$. While it is possible to operate the transistor 32 with moderate success as a two-way switch, the low-permeance rectifier 40 shunted across the output electrodes of the transistor conducts this reverse current at the start of the trace interval. The small voltage developed by the winding 35 in series with the rectifier 40 is useful in controlling the operation of the latter. The current produced in the rectifier 40 by the voltage across scanning winding 18 decreases as that voltage decreases, eventually becoming equal to the meanwhile increasing collector current of transistor 32, and then starts increasing by reason of diversion of a portion of the latter increasing current through the rectifier. The rectifier current therefore has the form represented by curve H and this current, taken with the collector current of curve G, produces a resultant current of saw-tooth wave form corresponding to that represented by curve I. Without the action of the rectifier 40, only the approximately saw-tooth wave form of curve G would be obtained. During the initial portion of the trace interval $t_1$–$t_6$, when rectifier 40 is discharging the energy stored in the winding 18 it not only aids in returning energy to the source −E but also relieves the transistor 32 of added dissipation which would be required of it in the absence of that rectifier. Consequently, the likelihood of injuring the transistor is reduced. Since the rectifier 40 is a semi-conductor junction device, a carrier-storage action takes place in it during at least the interval $t_1$–$t_4$ in a manner similar to that in the transistor 32.

As previously stated, reverse base current flows in the transistor 32 during the interval $t_2$–$t_6$ as represented by curve E. This reverse base current represents a sweeping out of the carriers in the base zone of the transistor and constitutes current which is being delivered to the line-scanning winding 18. Because the junction power transistor has a relatively poor transient response, it is incapable of cutting off abruptly at approximately time $t_6$ when a greater portion of the carriers has been swept out of the base zone. During the interval $t_2$–$t_4$, the collector current of the transistor 32 shown in curve G increases at a somewhat diminishing rate and, at approximately time $t_4$, that current begins to droop off for a brief interval of time and thereafter, just prior to time $t_6$, decreases abruptly as represented and falls to its zero value where it remains for the succeeding retrace interval $t_6$–$t_7$. It will be observed that the current of the rectifier 40 becomes more negative during the interval $t_2$–$t_4$ and then swings abruptly in a positive direction assuming a positive value during the interval $t_5$–$t_6$. This positive swing is caused by the large negative collector voltage pulse that begins at time $t_5$, as shown by curve J, which sweeps out the stored carriers in rectifier 40 to create an additional flow of current to the line-scanning winding 18. That current, in effect, compensates for the droop in the collector current occurring during approximately the interval $t_4$–$t_6$. As a result, the extreme terminal portion of the resultant current flowing in the line-scanning winding has a sharp saw-tooth edge as represented by curve I. This means that the scanning current increases substantially linearly until the end of the trace interval whereupon the current decreases very abruptly and almost instantaneously to its zero value. As previously mentioned, the rectifier 40 has a much better transient response than the transistor 32, so that when the carriers stored in the rectifier have been depleted, the rectifier current is capable of dropping almost instantaneously to its zero value as represented by the trailing edge of the positive-going pulse of current appearing during the interval $t_5$–$t_6$ as represented by curve H. Thus the rectifier 40 may be said to compensate for the deficiency of the transistor as a result of its relatively poor transient response. The cessation of all collector current at time $t_6$ causes the base current abruptly to terminate. The current then flowing at terminal 69 is therefore abruptly diverted into choke 72, inducing a large positive voltage at the base which also encourages transistor 32 to turn off more abruptly.

The collector voltage of the transistor 32 swings negatively as represented by curve J during the retrace intervals $t_0$–$t_1$ and $t_6$–$t_7$. The voltage pulses of curve J shock-excite that portion of the load circuit for the transistor 32 comprising the winding portion 36, the condenser 39, and the line-scanning winding 18 which were previously indicated as being resonant at a frequency at least 5 times the line-scanning frequency, thereby co-operating with the decaying base voltage pulse in promoting the establishment of a rapid retrace interval. Transient oscillations in the first half cycle of shock excitation are undesirable in the circuit just described since they affect the linearity of each trace portion of the current wave. Since the rectifier 40 is rendered conductive during each trace interval, it also serves to damp any undesired oscillations beyond the first half cycle. That is, besides its primary function of wave-form improvement by reason of carrier storage therein, as described above, the rectifier 40 also serves as a damping diode.

The collapsing magnetic field in the portion of the load circuit just described produces a positive polarity pulse during each retrace interval in a portion of the transformer 34. This pulse is stepped up to a very high potential by the winding portion 38 and is delivered to the diode 54 which peak-rectifies that pulse. The described operation repeats itself for succeeding pulsations and the rectified pulses, after being smoothed out by the condenser 56, are delivered as a high unidirectional potential to the terminal 28 for application to the second anode of the image-reproducing device 16. From the foregoing explanation it will be seen that the high potential applied to device 16 is developed in a manner which is well known in connection with high-voltage television power-supply apparatus of the so-called "kick-back type."

During the retrace intervals, positive potential pulses of a suitable lower magnitude are developed across the winding portion 37 and these are peak-rectified by the diode 51 and the filter network 52, 53 to develop a positive unidirectional potential in the order of 280 volts for application by the terminal 27 to the accelerating anode of the image-reproducing device 16. Only a few micro-amperes are required from the rectifier circuit including the diode 51 so that this rectifier circuit has very little effect on the described scanning circuit.

It will be seen from curve J of Fig. 3 that the output circuit of the transistor 32 has a relatively unvarying voltage during the trace interval $t_1$–$t_6$. The diode 44 of the potential-supply means 42 of the generating system 24 is poled so that it is rendered conductive only during trace intervals by a potential of a wave form corresponding to that of curve J developed in the winding 43. A unidirectional voltage is developed across the storage condenser 46 which is determined by the ratio of the turns of the winding 43 to those of the winding portion 36. As previously mentioned, this voltage is applied by the terminal 29 to the input terminal $+B_1$ of the radio-frequency amplifier 11 and the oscillator-modulator 12. Since the diode 44 rectifies a relatively unvarying trace voltage, there may be a substantial withdrawal of energy during trace intervals without significantly or detrimentally affecting the scanning wave or the high unidirectional potential developed during retrace intervals for application by terminal 28 to the second anode of the image-reproducing device 16. Tests have shown that the direct-current power extracted in this manner is obtained indirectly from the supply −E with about 95 percent efficiency. This efficiency is considerably greater than may be obtained if a separate power supply were constructed for the radio-frequency amplifier 11. While it is realized that the diode 44 does effect a small amount of damping of the output circuit of the transistor 32, the major damping is produced by the diode 40. The primary purpose of the diode 44 is to function as an element in the potential-supply means 42.

Similarly, the diode 48 responds during trace intervals to a substantially constant voltage applied thereto by the winding 47 and develops a voltage across the condenser 50 for application by the terminal 30 to the input terminal $+B_2$ of the video-frequency amplifier 15. The turns ratio of the winding 47 and the winding portion 36 is selected to develop the desired unidirectional voltage for application to the video-frequency amplifier. The remarks made above with reference to the rectifier circuit including the diode 44 likewise apply to the rectifier circuit including the diode 48.

It will be apparent that the withdrawal of substantial power by diodes 44 and 48 during trace intervals is due to the fact, as described, that transistor 32 is then in a saturated state so that its collector current has very little effect on the collector voltage. The collector voltage thus remains substantially constant, as shown by curve J in Fig. 3, thereby assuring linearity of the scanning wave, in spite of the fact that a substantial increase in collector current occurs to provide the auxiliary power made available by diodes 44 and 48 at terminals 29, 30, respectively. While the conventional damper diode of prior scanning circuits is also generally used to derive extra D.C. power during scanning intervals by discharging energy previously stored in the scanning windings during a preceding interval, this energy must be used virtually entirely to maintain linearity of the scanning wave and very little is available for use as an auxiliary energy used for other operations of a television receiver.

In accordance with the teachings of the present invention, it is possible to employ a junction power transistor which has a very poor transient response characteristic in conjunction with a semiconductor junction rectifier such as device 40. The dotted line portion of curve G represents the droop experienced in the current wave of such a transistor with a very poor transient response. To compensate for this poor response, the turns of the winding portion 35 may be selected for use with the particular semiconductor junction rectifier 40 so that a positive swing in the rectifier current occurs at time $t_3$ and increases to a rather high positive value at approximately time $t_6$ whereupon it decreases abruptly to its zero level. The extra energy supplied to the line-scanning winding 18 in the form of the positive swing of current represented by curve H causes the terminal portion of the sweep wave developed by the generating system to have a sharp saw-tooth edge similar to that represented by curve I. Thus, the nature of the system 24 for generating a periodic scanning current is such that there exists considerable flexibility in the design of the system.

While applicant does not wish to be limited to any particular set of circuit constants, the following have proved to be useful in a generating system as represented in the circuit diagram of Fig. 1:

| | |
|---|---|
| Resistor 52 | 3.3 megohms. |
| Resistor 71 | 220 ohms. |
| Condenser 39 | 0.047 microfarad. |
| Condensers 46, 50 | 4 microfarads. |
| Condenser 53 | 0.01 microfarad. |
| Condenser 65 | 0.047 microfarad. |
| Condenser 70 | 1 microfarad. |
| Inductor 68 | 260 turns around a ferrite slug. |
| Inductor 72 | 500 microhenries max. ohm D.-C. resistance. |
| Winding 18 | 162 microhenries 7 strands No. 30 enameled wire. |
| Winding 90 | 60 turns around a ferrite slug. |
| Transformer 34: | |
| Winding portion 35 | 2 turns No. 28 enameled wire. |
| Winding portion 36 | 20 turns No. 28 enameled wire. |
| Winding portion 37 | 90 turns No. 28 enameled wire. |
| Winding portion 38 | 1600 turns No. 38 single silk enameled wire. |
| Winding 43 | 1/60 turn No. 30 enameled wire. |
| Winding 47 | 112 turns No. 30 enameled wire. |
| Transistor 32 | Type 2N158. |
| Transistor 67 | Type 2N101. |
| Diodes 40, 44, 48, 51 | Type 1N158. |
| Diode 54 | Type 1X2-B. |
| $-E$, $-E'$ | −12 volts. |
| $+B_1$ | 120 volts at about 1.5 watts. |
| $+B_2$ | 84 volts at about 2 watts. |
| Voltage at terminal 27 | +280 volts. |
| Voltage at terminal 28 | 5.5 kilovolts. |

The generating system in accordance with the present invention offers a number of incidental benefits which should be mentioned. Since the line-scanning winding 18 will be subjected to only about 100-volt flyback pulses, it will not be subject to significant radiation and may be left unshielded, thus making it desirable to shield only the transformer 34 and the high-voltage rectifier circuit. The improved switching action in the circuit of the transistorized generating system 24 results in the system being more efficient than one employing an electron tube in lieu of the junction power transistor 32. Since that transistor is required to dissipate less energy, it is capable of operating with a rather small temperature rise. Applicant's experience with a generating system in accordance with the invention making use of a Delco 2N174 power transistor compares favorably with a similar electron-tube system for a television receiver employing a 17-inch cathode-ray tube that utilizes a 6BQ6-GT tube.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A system for generating a periodic scanning current comprising: a junction power transistor which has a collector electrode, an asymmetrical signal-translating characteristic, a relatively poor transient response as a result of being able to withstand a relatively high collector voltage prior to breakdown, a carrier-storage characteristic at the frequency of said scanning current, input electrodes, and output electrodes including said collector electrode; an essentially inductive load circuit coupled to said output electrodes and including means for coupling a scanning winding thereto; energizing means coupled to said output electrodes; means coupled to said input electrodes for applying thereto a periodic potential at the frequency of said scanning current which alternately stores carriers in said transistor to cause it to conduct increasing collector current at a substantially constant collector voltage during a first interval of said period and then sweeps the stored carriers therefrom to cause said transistor to conduct decreasing collector current at a decreasing collector voltage during a second subsequent interval thereof at the end of which said transistor becomes nonconductive at a rate influenced by its transient response; whereby the collector current produces a portion of said scanning current in said load circuit which tends to gradually terminate by the end of said second interval; and a semiconductor junction rectifier coupled to the output electrodes of said transistor and having a carrier storage characteristic responsive to the collector voltage thereof to store carriers during said first interval and to conduct the carriers so stored to said load circuit to provide another portion of the saw-tooth current therein during said second interval, the transient response of said rectifier being such that the current it thereby supplies to said load circuit during said second interval supplements the decreasing collector current then being supplied thereto to produce a resultant scanning current of improved saw-tooth wave form which terminates in accordance with the transient response of said rectifier.

2. A switching system comprising: a junction power transistor which has a collector electrode, an asymmetrical signal-translating characteristic, a relatively poor transient response as a result of being able to withstand a relatively high collector voltage prior to breakdown, a carrier-storage characteristic at the operating frequency of said system, input electrodes, and ouput electrodes including said collector electrode; an essentially inductive load circuit coupled to said output electrodes; energizing means coupled to said output electrodes; means coupled to said input electrodes for applying thereto a periodic potential at the frequency of said system which alternately stores carriers in said transistor to cause it to conduct increasing collector current at a substantially constant collector voltage during a first interval of said period and then sweeps the stored carriers therefrom to cause said transistor to conduct decreasing collector current at a decreasing collector voltage during a second subsequent interval thereof at the end of which said transistor becomes nonconductive at a rate influenced by its transient response, whereby the collector current flows in said load circuit to produce an output signal having approximately the desired wave form; and a semiconductor junction rectifier coupled to the output electrodes of said transistor and having a carrier storage characteristic responsive to the collector voltage thereof to store carriers during said first interval and to conduct the carriers so stored to said load circuit during said second interval, the transient response of said rectifier being such that the current it thereby supplies to said load circuit during said second interval supplements the decreasing collector current then being supplied thereto to produce a resultant output signal of improved wave form which terminates in accordance with the transient response of said rectifier.

3. A system for generating a periodic scanning current comprisng: a junction power transistor which has a collector electrode, an asymmetrical signal-translating characteristic, a relatively poor transient response as a result of being able to withstand a relatively high collector voltage prior to breakdown, a carrier-storage characteristic at the frequency of said scanning current, input electrodes, and output electrodes including said collector electrode; an essentially inductive load circuit coupled to said output electrodes and including a scanning winding which is resonant at a frequency at least several times that of the scanning current; energizing means coupled to said output electrodes; means coupled to said input electrodes for applying thereto a periodic potential at the frequency of said scanning current which alternately stores carriers in said transistor causing it to conduct increasing collector current at a substantially constant collector voltage during a first interval of said period and then sweeps the stored carriers therefrom to cause said transistor to conduct decreasing collector current at a decreasing collector voltage during a second subsequent interval therof at the end of which said transistor becomes nonconductive at a rate influenced by its transient response, whereby the collector current produces a portion of said scanning current in said load circuit which tends to gradually terminate by the end of said second interval; and a semiconductor junction rectifier coupled to the output electrodes of said transistor and having a carrier storage characteristic responsive to the collector voltage thereof to store carriers during said first interval and to conduct the carriers so stored to said load circuit to provide another portion of the saw-tooth current herein during said second interval, the transient response of said rectifier being such that the current it thereby supplies to said load circuit during said second interval supplements the decreasing collector current then being supplied thereto to produce a resultant scanning current of improved saw-tooth wave form which terminates in accordance with the transient response of said rectifier.

4. A system for generating a periodic scanning current comprising: a junction power transistor which has emitter, base, and collector electrodes, an asymmetrical signal-translating characteristic, a relatively poor transient response as a result of being able to withstand a relatively high collector voltage prior to breakdown, and a carrier-storage characteristic at the frequency of said scanning current; an essentially inductive load circuit coupled to said collector and emitter electrodes and including means for coupling a scanning winding thereto; energizing means coupled to said collector and emitter electrodes; means coupled to said emitter and base electrodes for applying thereto a periodic potential at the frequency of said scanning current which alternately stores carriers in said transistor to cause it to conduct increasing collector current at a substantially constant collector voltage during a first interval of said period and then sweeps the stored carriers therefrom to cause said transistor to conduct decreasing collector current at a decreasing collector voltage during a second subsequent interval thereof at the end of which said transistor becomes nonconductive at a rate influenced by its transient response, whereby the collector current produces a portion of said scanning current in said load circuit which tends to gradually terminate by the end of said second interval; and a semiconductor junction rectifier coupled to said collector and emitter electrodes of said transistor and having a carrier storage characteristic responsive to the collector voltage thereof to store carriers during said first interval and to conduct the carriers so stored to said load circuit to provide another portion of the saw-tooth current therein during said second interval, the transient response of said rectifier being such that the current it thereby supplies to said load circuit during said second interval supplements the decreasing collector current then being supplied thereto to produce a resultant scanning current of improved saw-tooth wave form which terminates in accordance with the transient response of said rectifier.

5. A system for generating a periodic scanning current comprising: a junction power transistor which has a collector electrode, an asymmetrical signal-translating characteristic, a relatively poor transient response as a result of being able to withstand a relatively high collector voltage prior to breakdown, a carrier-storage characteristic at the frequency of said scanning current, input electrodes, and output electrodes including said collector electrode; an essentially inductive load circuit including a transformer having cascade connected first and second winding portions and including means for coupling a scanning winding to said second portion; energizing means coupled to said output electrodes through said second winding portion; means coupled to said input electrodes for applying thereto a periodic potential at the frequency of said scanning current which alternately stores carriers in said transistor to cause it to conduct increasing collector current at a substantially constant collector voltage during a first interval of said period and then sweeps the stored carriers therefrom to cause said transistor to conduct decreasing collector current at a decreasing collector voltage during a second subsequent interval thereof at the end of which said transistor becomes nonconductive at a rate influenced by its transient response, whereby the collector current produces a portion of said scanning current in said load circuit which tends to gradually terminate by the end of said second interval; and a semiconductor junction rectifier coupled to the output electrodes of said transistor through said first winding portion and having a carrier storage characteristic responsive to said collector voltage to store carriers during said first interval and to conduct the carriers so stored to said load circuit to provide another portion of the saw-tooth current therein during said second interval, the transient response of said rectifier being such that the current it thereby supplies to said load circuit during said second interval supplements the decreasing collector current then being supplied thereto to produce a resultant scanning current of improved saw-tooth wave form which terminates in accordance with the transient response of said rectifier.

6. A system for generating a periodic scanning current comprising: a junction power transistor which has a collector electrode, an asymmetrical signal-translating characteristic, a relatively poor transient response as a result of being able to withstand a relatively high collector voltage prior to breakdown, a carrier-storage characteristic at the frequency of said scanning current, input electrodes, and output electrodes including said collector electrode; an essentially inductive load circuit including an auto-transformer having a first winding portion and having a second winding portion with more turns than said first portion coupled to said output electrodes and including means for coupling a multistrand scanning winding to said second portion; energizing means coupled to said output electrodes through said second winding portion; means coupled to said input electrodes for applying thereto a periodic potential at the frequency of said scanning current which alternately stores carriers in said transistor causing it to conduct increasing collector current at a substantially constant collector voltage during a first interval of said period and then sweeps the stored carriers therefrom to cause said transistor to conduct decreasing collector current at a decreasing collector voltage during a second subsequent interval thereof at the end of which said transistor becomes nonconductive at a rate influenced by its transient response, whereby the collector current produces a portion of said scanning current in said load circuit which tends to gradually terminate by the end of said second interval; and a semiconductor junction rectifier coupled to the output electrodes of said transistor through said first winding portion and having a carrier storage characteristic responsive to said collector voltage to store carriers during said first interval and to conduct the carriers so stored to said load circuit to provide another portion of the saw-tooth current therein during said second interval, the transient response of said rectifier being such that the current it thereby supplies to said load circuit during said second interval supplements the decreasing collector current then being supplied thereto to produce a resultant scanning current of improved saw-tooth wave form which terminates in accordance with the transient response of said rectifier.

7. A system for generating a periodic scanning current comprising: a junction power transistor which has a collector electrode, an asymmetrical signal-translating characteristic, a relatively poor transient response as a result of being able to withstand a relatively high collector voltage prior to breakdown, a carrier-storage characteristic at a frequency of said scanning current, input electrodes, and output electrodes including said collector electrode; an essentially inductive load circuit coupled to said output electrodes and including means for coupling a scanning winding thereto; energizing means coupled to said output electrodes; means for supplying a sine-wave potential having the frequency of said scanning current; means including a circuit resonant at said frequency and coupled to said supply means and said input electrodes and including a choke coil coupled between said input electrodes for applying thereto a periodic pulse potential having said frequency which alternately renders said transistor conductive and nonconductive, alternately stores carriers in said transistor and removes at least some therefrom at a rate influenced by said transient response, alternately stores energy in said load circuit and develops therein said scanning current with an approximately saw-tooth wave form; and a semiconductor junction rectifier which is coupled to said output electrodes, has a transient response which may be different from that of said transistor and has a carrier-storage characteristic that permits a substantial reverse-current conduction in said rectifier at a time such that said conduction effectively supplements said transient response of said transistor, alternately transfers said stored energy to said energizing means, and improves the saw-tooth wave form of said scanning current.

8. A system for generating a periodic scanning current comprising: a junction power transistor which has a collector electrode, an asymmetrical signal-translating characteristic, a relatively poor transient response as a result of being able to withstand a relatively high collector voltage prior to breakdown, a carrier-storage characteristic at a frequency of said scanning current, input electrodes, and output electrodes including said collector electrode; an essentially inductive load circuit coupled to said output electrodes and including means for coupling a scanning winding thereto; energizing means coupled to said output electrodes; means for supplying a sine-wave potential having the frequency of said scanning current; means including a series-tuned circuit resonant at said frequency and coupled to said supply means and between said input electrodes and including the parallel combination of a choke coil and a damping resistor connected between said input electrodes for applying thereto a periodic pulse potential having said frequency which alternately renders said transistor conductive and nonconductive, alternately stores carriers in said transistor and removes at least some therefrom at a rate influenced by said transient response, alternately stores energy in said load circuit and develops therein said scanning current with an approximately saw-tooth wave form; and a semiconductor junction rectifier which is couplied to said output electrodes, has a transient response which may be different from that of said transistor and has a substantial carrier-storage characteristic that permits a substantial reverse-current conduction in said rectifier at a time such that said conduction effectively supplements said transient response of said transistor, alternately transfers said stored energy to said energizing means, and improves the saw-tooth wave form of said scanning current.

9. A system for generating a periodic scanning current comprising: a junction power transistor which has emitter, base, and collector electrodes, an asymmetrical signal-translating characteristic, a relatively poor transient response as a result of being able to withstand a relatively high collector voltage prior to breakdown, and a carrier-storage characteristic at a frequency of said scanning current; an essentially inductive load circuit coupled to said collector and emitter electrodes and including means for coupling a scanning winding thereto; energizing means coupled to said collector and emitter electrodes; means for supplying a sine-wave potential having the frequency of said scanning current; means including a series-tuned circuit resonant at said frequency and coupled to said supply means and between said emitter and base electrodes and including the parallel combination of a choke coil and a damping resistor connected between said base and emitter electrodes for applying thereto a periodic pulse potential having said frequency which alternately renders said transistor conductive and nonconductive, alternately stores carriers in said transistor and removes at least some therefrom at a rate influenced by said transient response, alternately stores energy in said load circuit and develops therein said scanning current with an approximately saw-tooth wave form; and a semiconductor junction rectifier which is coupled between said collector and emitter electrodes, has a transient response which may be different from that of said transistor and has a carrier-storage characteristic that permits a substantial reverse-current conduction in said rectifier at a time such that said conduction effectively supplments said transient response of said transistor, alternately transfers said stored energy to said energizing means, and improves the saw-tooth wave form of said scanning current.

10. A system for generating a periodic scanning current comprising: a junction power transistor which has emitter, base, and collector electrodes, an asymmetrical signal-translating characteristic, a relatively poor transient response as a result of being able to withstand a relatively high collector voltage prior to breakdown, and a carrier-storage characteristic at a frequency of said scanning current; an essentially inductive load circuit coupled to said collector and emitter electrodes and including means for coupling a scanning winding thereto; energizing means coupled to said collector and emitter electrodes; means including a transistor with an emitter load circuit for supplying a sine-wave potential having the frequency of said scanning current; means including a series-tuned circuit coupled to said emitter load circuit and between said emitter and base electrodes and including the parallel combination of a choke coil and a damping resistor connected between said base and emitter electrodes for applying thereto a periodic pulse potential having said frequency which alternately renders said transistor conductive and nonconductive, alternately stores carriers in said transistor and removes at least some therefrom at a rate influenced by said transient response, alternately stores energy in said load circuit and develops therein said scanning current with an approximately saw-tooth wave form; and a semiconductor junction rectifier which is coupled to said collector and emitter electrodes, has a transient response which may be different from that of said transistor and has a carrier-storage characteristic that permits a substantial reverse-current conduction in said rectifier at a time such that said conduction effectively supplements said transient response of said transistor, alternately transfers said stored energy to said energizing means, and improves the saw-tooth wave form of said scanning current.

11. A system for generating a periodic scanning current comprising: a junction power transistor which has a collector electrode, an asymmetrical signal-translating characteristic, a relatively poor transient response as a result of being able to withstand a relatively high collector voltage prior to breakdown, a carrier-storage characteristic at the frequency of said scanning current, input electrodes, and output electrodes including said collector electrode; an essentially inductive load circuit including a transformer having a plurality of winding portions coupled to said output electrodes and including means for coupling a scanning winding to one of said winding portions; energizing means coupled to said output electrodes through said one winding portion; means coupled to said input electrodes for applying thereto a periodic potential at the frequency of said scanning current which alternately stores carriers in said transistor to cause it to conduct increasing collector current at a substantially constant collector voltage during a first interval of said period and then sweeps the stored carriers therefrom to cause said transistor to conduct decreasing collector current at a decreasing collector voltage during a second subsequent interval thereof at the end of which said transistor becomes nonconductive at a rate influenced by its transient response, whereby the collector current produces a portion of said scanning current in said load circuit which tends to gradually terminate by the end of said second interval; and a semiconductor junction rectifier coupled to the output electrodes of said transistor through another of said winding portions and having a carrier storage characteristic responsive to said collector voltage to store carriers during said first interval and to conduct the carriers so stored to said load circuit to provide another portion of the saw-tooth current therein during said second interval, the transient response of said rectifier being such that the current it thereby supplies to said load circuit during said second interval supplements the decreasing collector current then being supplied thereto to produce a resultant scanning current of improved saw-tooth wave form which terminates in accordance with the transient response of said rectifier; and a potential-supply means coupled through others of said winding portions for developing a plurality of unidirectional potentials having different potential levels.

12. An energy-supply apparatus for a television receiver comprising: a transistor having input and output electrodes; means for applying a periodic wave to said input electrodes; a load circuit including a transformer having a plurality of winding portions, means for connecting a scanning coil to one of said winding portions, a direct-current circuit which includes unidirectional potential-supply means, one of said winding portions, and a first unidirectionally conductive device, and means conductively connecting one of said winding portions to said output electrodes; said load circuit being responsive to said periodic wave for developing a saw-tooth current in said scanning coil during periodic trace intervals respectively followed by periodic retrace intervals and for developing in said transformer a potential of periodic pulses occurring during said retrace intervals of said saw-tooth current and a more constant potential during said trace intervals; and a potential-supply system which includes a second unidirectionally conductive device inductively coupled to said load circuit and responsive to the developed potential during said trace intervals of said saw-tooth current for deriving substantial power at a unidirectional potential level different from that of said supply means.

13. An energy-supply apparatus for a television receiver comprising: a transistor having input and output electrodes; means for applying a periodic wave to said input electrodes; a load circuit including a transformer having a plurality of winding portions, means for connecting a scanning coil to one of said winding portions, a direct-current circuit which includes unidirectional potential-supply means, said winding portions, and a first unidirectionally conductive device, and means conductively connecting said one winding portion to said output electrodes; said load circuit being responsive to said periodic wave for developing a saw-tooth current in said scanning coil during periodic trace intervals respectively followed by periodic retrace intervals and for developing in said transformer a potential of periodic pulses occurring during said retrace intervals of said saw-tooth current and a more constant potential during said trace intervals; and a potential-supply system which includes a second unidirectionally conductive device inductively coupled to said load circuit and responsive to the developed potential during said trace intervals of said saw-tooth current for deriving substantial power at a unidirectional potential level different from that of said supply means.

14. An energy-supply apparatus for a television receiver comprising: a transistor having input and output electrodes; means for applying a periodic wave to said input electrodes; a load circuit including a transformer having a plurality of winding portions, means for connecting a scanning coil to one of said winding portions, a direct-current circuit which includes unidirectional potential-supply means, one of said winding portions, and a first unidirectionally conductive device, and means conductively connecting one of said winding portions to said output electrodes; said load circuit being responsive to said periodic wave for developing a saw-tooth current in said scanning coil during periodic trace intervals respectively followed by periodic retrace intervals and for developing in said transformer a potential of periodic pulses occurring during said retrace intervals of said saw-tooth current and a more constant potential during said trace intervals; and a potential-supply system which includes a second unidirectionally conductive device inductively coupled to said load circuit and responsive to the developed potential during said trace intervals of said saw-tooth current for deriving substantial power at a first unidirectional potential level greater than that of said supply means and which also includes a third unidirectionally conductive device responsive to said pulses during said retrace intervals for deriving therefrom power which is much less than that of said first-mentioned power and at a second unidirectional potential level much greater than that of said first unidirectional potential level.

15. An energy-supply apparatus for a television receiver comprising: a junction power transistor having emitter-base input and collector-emitter output electrodes; means for applying a periodic wave recurring at line-scanning frequency to said input electrodes; a load circuit including a transformer having a plurality of winding portions, means for connecting a line-scanning coil in parallel with one of said winding portions, a direct-current circuit which includes unidirectional potential-supply means, one of said winding portions, and a first semiconductor junction diode, and means conductively connecting one of said winding portions to said output electrodes; said load circuit being responsive to said periodic wave for developing a saw-tooth current in said scanning coil during periodic trace intervals respectively followed by periodic retrace intervals and for developing in said transformer a potential of periodic pulses occurring during said retrace intervals of said saw-tooth current and a more constant potential during said trace intervals; and a potential-supply system which includes a unidirectionally conductive device inductively coupled by another of said winding portions to said load circuit and which is poled to conduct in response to the developed potential during said trace intervals of said saw-tooth current for deriving substantial power at a unidirectional potential level different from that of said supply means.

16. An energy-supply apparatus for a television receiver comprising: a junction power transistor having emitter-base input and collector-emitter output electrodes; means for applying a periodic wave recurring at line-scanning frequency to said input electrodes; a load circuit including a transformer having a plurality of winding portions, a condenser, a line-scanning coil connected to one of said winding portions and said condenser and resonant with said condenser at a frequency at least five times said line-scanning frequency, a direct-current circuit which includes unidirectional potential-supply means, one of said winding portions, and a first unidirectionally conductive device, and means conductively connecting one of said winding portions to said output electrodes; said load circuit being responsive to said periodic wave for developing a saw-tooth current in said scanning coil during periodic trace intervals respectively followed by periodic retrace intervals and for developing in said transformer a potential of periodic pulses occurring during said retrace intervals of said saw-tooth current and a more constant potential during said trace intervals; and a potential-supply system which includes a second unidirectionally conductive device inductively coupled to said load circuit and which is poled to conduct in response to the developed potential during said trace intervals of said saw-tooth current for deriving substantial power at a unidirectional potential level different from that of said supply means.

No references cited.